(12) United States Patent
Jiang et al.

(10) Patent No.: US 7,551,652 B1
(45) Date of Patent: *Jun. 23, 2009

(54) SIMULTANEOUSLY Q-SWITCHED FIBER LASERS USING A SHARED MODULATOR

(75) Inventors: Shibin Jiang, Tucson, AZ (US); Wei Shi, Tucson, AZ (US); Matthew A. Leigh, Tucson, AZ (US); Jie Zong, Tucson, AZ (US)

(73) Assignee: NP Photonics, Inc, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/588,933

(22) Filed: Oct. 27, 2006

(51) Int. Cl.
*H01S 3/115* (2006.01)

(52) U.S. Cl. .......................... 372/12; 372/17

(58) Field of Classification Search ............ 372/12, 372/21, 40, 6; 356/28, 22, 17; 250/338.1
See application file for complete search history.

(56) References Cited

U.S. PATENT DOCUMENTS

| | | | | |
|---|---|---|---|---|
| 4,866,720 | A * | 9/1989 | Holly | 372/23 |
| 5,237,576 | A | 8/1993 | DiGiovanni et al. | |
| 5,561,675 | A | 10/1996 | Bayon et al. | |
| 5,634,922 | A * | 6/1997 | Hirano et al. | 606/10 |
| 5,991,316 | A * | 11/1999 | Kikuchi | 372/21 |
| 6,480,637 | B1 | 11/2002 | Yao | |
| 6,738,397 | B2 * | 5/2004 | Yamamoto et al. | 372/21 |
| 7,054,339 | B1 * | 5/2006 | Hu et al. | 372/12 |

2004/0057471 A1 3/2004 Shevy et al.

OTHER PUBLICATIONS

Anthony E. Siegman, "Laser Q-Switching", University Science Books, ISBN 0-0935702-11-5, 1996, p. 1003-1007.
Walter Koechner, "Electrooptical Q-Switches", Solid State Laser Engineering—Third Revised and Updated Edition.
Nobuyuki Imoto et al., "Birefringence in Single-Mode Opt. Fiber due to Elliptical Core Deformation & Stress Anisotropy", IEEE Journal of Quantum Electronics, vol. QE-16, No. 11, Nov. 1980 pp. 1267-1271.
Takeshi Imai et al., "A Wavelength Tunable Q-Switched Erbium-Doped Fiber Laser with Fiber Bragg Grating Mirrors", Jpn.J.Appl. Phys., vol. 35 (1996), pp. 1275-1277.
Ana Rosa Boyain et al., "Low-frequency and high-frequency modulators based on birefringence modulation", Applied Optics, vol. 38, No. 30, Oct. 20, 1999, pp. 6278-6283.
H.H. Kee, "A stable narrow linewidth Q-Switched fiber laser", CLEO '99, pp. 246-247.
T. Oleskevich et al., "High-power Q-Switched fiber laser", Proceedings of the SPIE—The International Society for Optical Engineering, vol. 2041, 1994, pp. 291-297.

(Continued)

*Primary Examiner*—Minsun Harvey
*Assistant Examiner*—Tuan N. Nguyen
(74) *Attorney, Agent, or Firm*—Eric A. Gifford

(57) ABSTRACT

A shared modulator applies radial stress to the polarization-dependent fiber chains to induce birefringence and simultaneously Q-switch two or more fiber lasers. Multiple temporally overlapping pulsed beams can be generated with pulses <100 ns and even <30 ns with repetition rates from 50 Hz up to 650 KHz. A pair of Q-switched fiber lasers at slightly different wavelengths being well suited to provide a low-frequency light source through difference frequency generation (DFG) by nonlinear optical materials.

14 Claims, 8 Drawing Sheets

OTHER PUBLICATIONS

Cai et al. Optical Fiber Communication Conference and Exhibit, Mar. 17-22, 2002 pp. 654-655.

Zhao et al. "A New Structure Optical Wavelength-Selective Switch", CLEO, Pacific Rim 1999, pp. 525-526.

Hatanaka et al. "Tunable terahertz-wave generation from DAST crystal by dual signal-wave parametric oscillation of periodically poled lithium niobate", Optics Letters, vol. 25, No. 23, Dec. 1, 2000, pp. 1714-1716.

Wei Shi et al. "Efficient, tunable, and coherent 0.18-5.27 THz source based on GaSe crystal", Optics Letters, vol. 27, No. 16, Aug. 15, 2002.

* cited by examiner

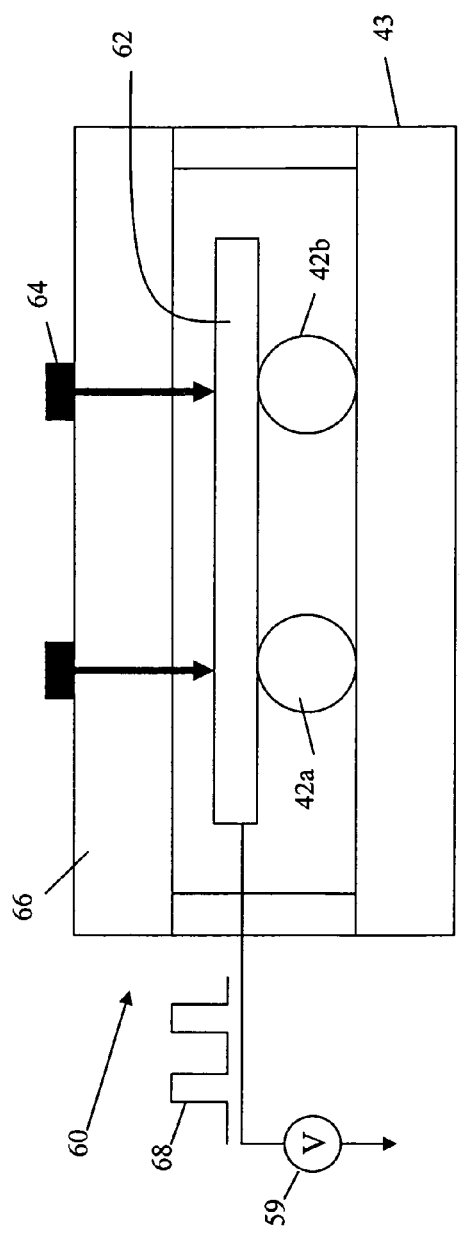
Fig. 4
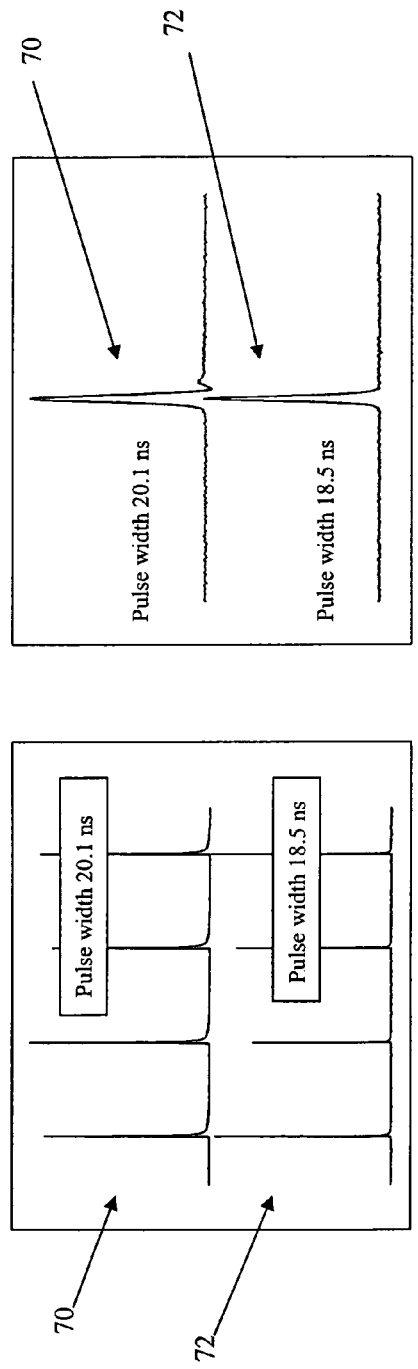
Fig. 5b
Fig. 5a

SIMULTANEOUSLY Q-SWITCHED FIBER LASERS USING A SHARED MODULATOR

GOVERNMENTAL RIGHTS

This invention was made with Government support under Contract N66001-06-C-6003 awarded by The Space and Naval Warfare Systems Center San Diego (SPAWARSYSCEN SD) The Government has certain rights in this invention.

BACKGROUND OF THE INVENTION

1. Field of the Invention

This invention relates to Q-switched lasers and more specifically to the use of a shared modulator to control a plurality of Q-switched fiber lasers to provide temporally overlapping pulses. A pair of Q-switched fiber lasers at slightly different wavelengths being well suited to provide a low-frequency light source through difference frequency generation (DFG) by nonlinear optical materials.

2. Description of the Related Art

Q-switching is a widely used laser technique in which a laser pumping process is allowed to build up a much larger than usual population inversion inside a laser cavity, while keeping the cavity itself from oscillating by removing the cavity feedback or greatly increasing the cavity losses. After a large inversion has been developed, the high Q cavity is restored to its usual large value, hence bringing the Q-factor to a high value, producing a very short, intense burst which dumps all the accumulated population inversion in a single short laser pulse. Modulation of the cavity produces repetitive pulses.

As illustrated in FIGS. 1a through 1d, the cavity loss 10 is initially set at some artificially high value—that is, at an artificially low value of the laser cavity $Q_c$—while the inversion 12, hence the gain and the stored energy, in the laser medium are pumped up to a value much larger than normally present in the oscillating laser. The cavity loss is then suddenly lowered to a more normal value (higher $Q_c$) so that the round-trip gain after switching is much larger than the cavity loss. The initial stimulated emission in the laser cavity then immediately begins to build up at an unusually rapid rate, soon developing into a rapidly rising and intense burst, or "giant pulse" 14 of laser oscillation. The oscillation signal rapidly drives the inversion 12 down below the new cavity loss level, after which the oscillation signal in the cavity dies out nearly as rapid as it rose. The peak power in the Q-switched pulse can be several orders of magnitude more intense than a cw laser created in the same laser with the same pumping rate.

Some of the more common free-space Q-switching methods employed in practical laser systems are shown in FIGS. 2a through 2c. The laser cavity includes a gain medium 22 and a pair of mirrors 24 and 26. As shown in FIG. 2a, mirror 26 is rotated (spinning motor shaft) so that the laser is oscillated only during the brief interval when mirror 26 is aligned with mirror 24. As shown in FIG. 2b, an electrooptic crystal 28 which becomes birefringent under the influence of applied voltage and one or more prisms 30 are placed inside the cavity. The birefringent crystal 28 rotates the polarization of the light energy so that it is coupled out of the cavity by the prism 30. Electrooptic Q-switching provides fast switching with precise timing and good stability but the repeat rate is relatively slow and the crystal and pulse source are fairly expensive, as the voltage needed to switch one polarization to the other is more than a few hundred volts. As shown in FIG. 2c, an rf acoustic wave created in the optical material 32 at the Bragg condition diffracts light out of the cavity to lower the Q. Acoustic modulators have a fast repeat rate but are expensive and a slower switch speed as well as limited aperture size.

Cai et al. Optical Fiber Communication Conference and Exhibit, 2002, 17-22 Mar pp 654-655 reports on a Q-switched erbium doped fiber laser using a fiber Bragg grating placed in a loop mirror (FBGLM) as an all-fiber wavelength-selective intensity modulator. Cai's FBGLM acts like a Michelson interferometer in which Q-switching is achieved with a PZT that stretches/compresses the fiber axially to change the optical path length between the 3 dB-coupler and the FBG in the upper portion of the loop. A detailed explanation of the FBGLM is provided in Zhao et al. "A New Structure Optical Fiber Wavelength-Selective Switch", CLEO, Pacific Rim 1999, pp. 525-526.

In many cases, for example, optical nonlinear processes in nonlinear crystal such as difference-frequency generation (DFG), two Q-switched lasers with excellent temporal overlap are needed. For GHz or THz generation two laser beams with a specific frequency difference will be needed. Since the laser pulse is on the scale of nanoseconds, the two pulsed beams have to be controlled extremely carefully, which is very difficult to achieve.

Hatanaka et al. "Tunable terahertz-wave generation from DAST crystal by dual signal-wave parametric oscillation of periodically poled lithium niobate", Optics Letters, Vol. 25, No. 23, Dec. 1, 2000, pp. 1714-1716 describes a THz source that uses a single free-spaced Q-switched Nd:YAG laser to pump a cavity having two different wavelength grating to produces pulses at two different wavelengths, which are input to a DAST to produce a THZ source through difference frequency generation. This structure produces two perfectly overlapping pulses. However, the polarization of the beams should be perpendicular when they enter the DAST and controlling the polarization of two beams in one fiber, particularly a gain fiber, is more complicated.

There remains a need for generating simultaneous Q-switched fiber lasers that provides for narrow pulse widths and fast repeat rates.

SUMMARY OF THE INVENTION

The present invention provides simultaneously Q-switched fiber lasers with narrow pulse widths and fast repeat rates.

This is accomplished with a shared modulator that applies radial stress to the fiber chains simultaneously to switch the Q-switched fiber lasers. Each laser includes a fiber chain in which a gain medium is provided between narrow and broadband fiber gratings that define a polarization-dependent resonant cavity. A pump source couples energy into the fiber chain to pump the gain medium. The shared modulator applies radial stress to the fiber chain by pushing or pulling on the fiber to induce birefringence. The interaction of the birefringence with the polarization-dependent cavity switches the cavity Q-factor to alternately store energy in the gain fiber and then release the energy in a laser pulse. The use of a shared modulator such as a PZT ensures that the pulses from the two (or more) Q-switched lasers will overlap temporally, preferably with near perfect alignment, even for very narrow pulse widths and fast repeat rates.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a diagram of a shared modulator for controlling the Q-switched lasers;

FIGS. 5a and 5b are plots of the temporally overlapping pulse sequences;

DETAILED DESCRIPTION OF THE INVENTION

The present invention provides a shared modulator that applies radial stress to the polarization-dependent fiber chains to induce birefringence and simultaneously Q-switch two or more fiber lasers. Multiple temporally overlapping pulsed beams can be generated with pulses <100 ns and even <30 ns with repetition rates from 50 Hz up to 650 KHz. A pair of Q-switched fiber lasers at slightly different wavelengths being well suited to provide a low-frequency light source such as GHz or THz radiation through difference frequency generation (DFG) by nonlinear optical materials.

Figure 1A:
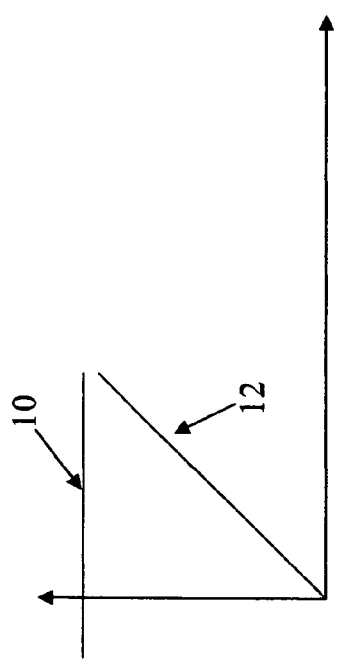
FIGS. 1a-1d, as described above, is a schematic illustrating the fundamental dynamics of laser Q-switching.
Figure 1B:
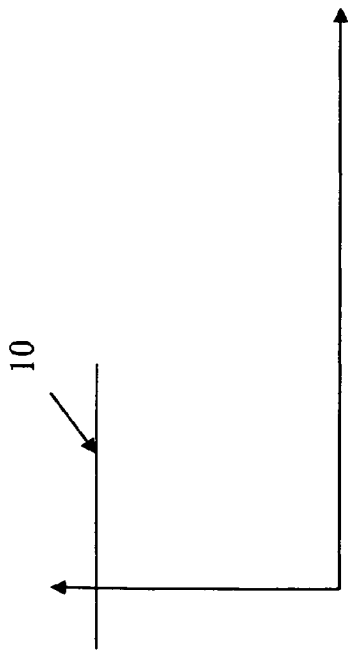
Figure 1C:
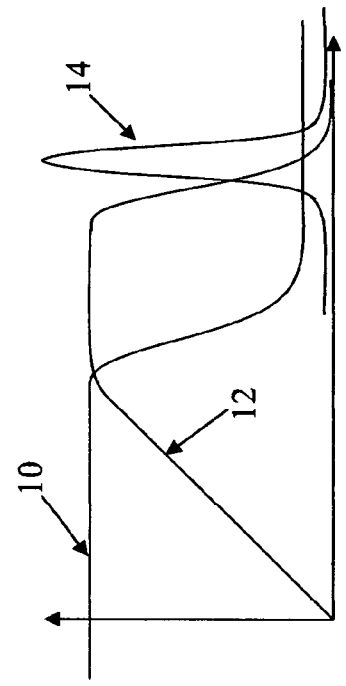
Figure 1D:
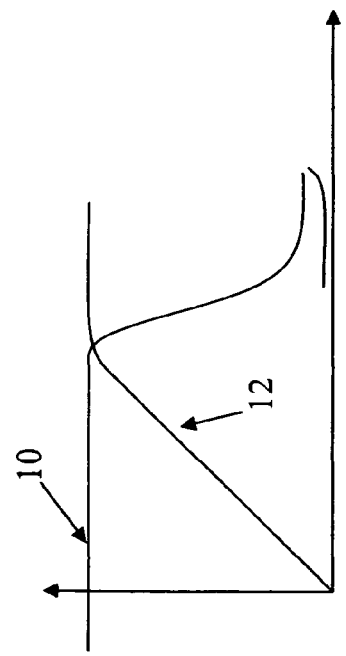
Figure 2A:
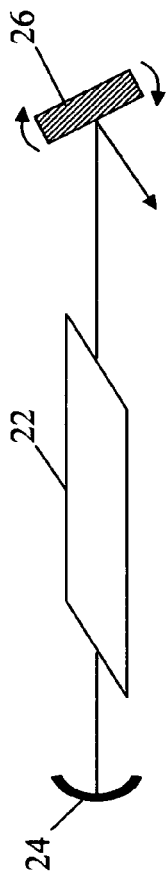
FIGS. 2a-2c, as described above, are diagrams of known free-space Q-switched lasers.
Figure 2B:
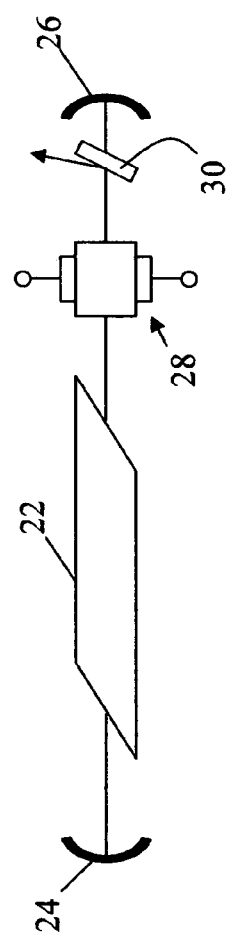
Figure 2C:
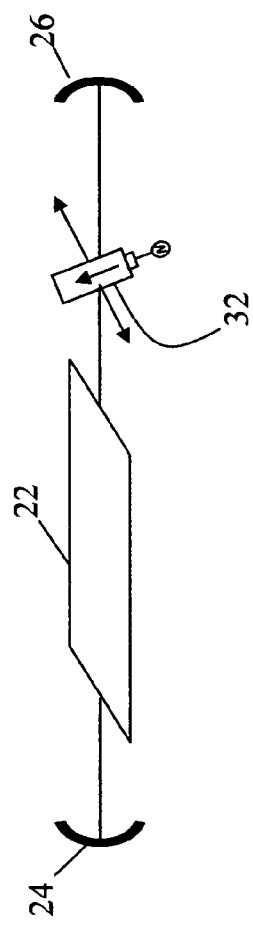
Figure 3:
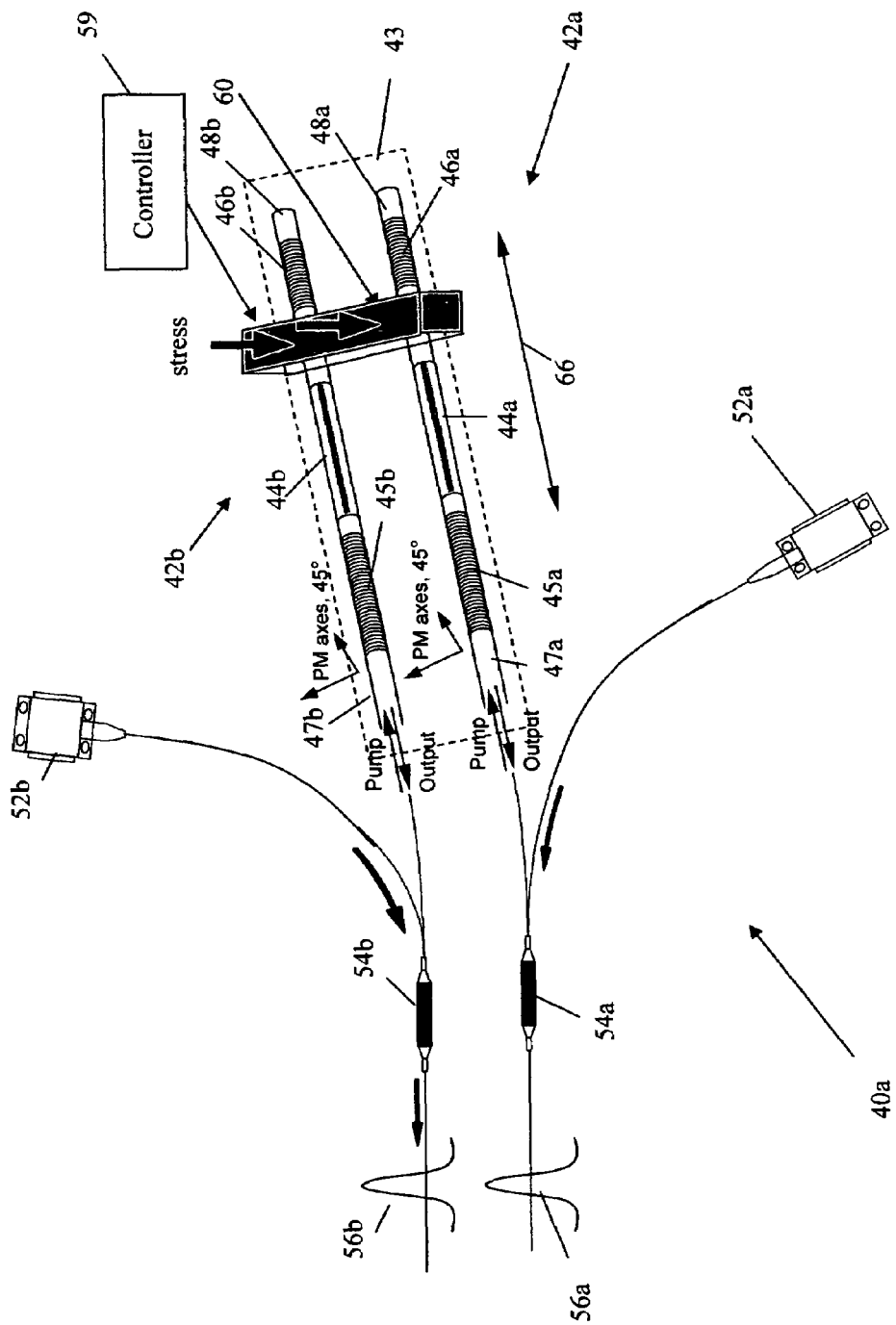
FIG. 3 is a block diagram of a pair of simultaneously Q-switched fiber lasers in accordance with the invention.

As shown in FIG. 3, all-fiber Q-switched lasers 40a and 40b each include a fiber chain 42a and 42b held in a shared mounting fixture 43. The fiber chain includes a gain medium 44a (44b) formed between narrowband and broadband fiber gratings 45a (45b) and 46a (46b) that define a polarization-dependent resonant cavity. In one embodiment of the fiber chain, the narrowband grating 45a (45b) is formed in a polarization-maintaining (PM) fiber 47a (47b), the gain medium 44a (44b) is a specialty active fiber such as highly Er/Yb codoped phosphate glass, and the broadband grating 46a (46b) is formed in a non-PM fiber 48a (48b). Any one (or more) of the three fiber segments can be PM to generate a PM laser but to achieve the high cavity losses required to generate the high energy pulses it is preferable to form one of the gratings in a PM fiber.

One of the gratings, suitably narrowband grating 45a (45b), also functions as an output coupler with a reflection of typically 10-80%. The narrowband grating, provided it is sufficiently narrow, e.g. 0.05 nm for a 1.5 µm laser wavelength, resolves two reflection bands that correspond to different polarization modes, e.g. V and H polarization. The highly reflective broadband grating has a broad reflection band that overlaps, and is preferably aligned with, one of the two reflection bands, to define a polarization dependent cavity with a high Q factor for light at the laser wavelength and the correct polarization. If single-frequency operation is desired, the longitudinal mode spacing of the cavity can be configured so that there are only a few longitudinal modes supported in the reflection band of the narrowband grating. Single-frequency operation can be maintained by proper adjustment of the temperature of the FBGs as well as the entire cavity.

A pump source 52a (52b) such as a single or multi-mode laser diode couples energy into fiber chain 42a (42b) to pump gain medium 44a (44b). The laser is suitably pumped by a fiber-pigtailed, single-mode, 976-nm diode 52a (52b) for telecommunication applications. The pump light is coupled to the laser cavity through the grating 45a (45b), which is spliced to a WDM coupler 54a (54b) to separate the pump from the pulsed laser output 56a (56b).

A controller 59 applies a series of voltages pulses to a shared modulator 60 such as a piezoelectric transducer (PZT), which in turn simultaneously applies mechanical stress radially to a portion of the fiber chains 42a and 42b to affect their birefringence and change the cavity Q-factor during the pulse. Stress is preferably applied to a non-PM segment of fiber because silica fiber is stronger than multi-component glass fiber. Typically, in the normal or unstressed state, the cavity losses are low (high Q) to sustain lasing. Thus, the stress-induced birefringence interacts with the polarization-dependent cavity to lower the Q so that cavity losses exceed the gain and the pump energy is stored in the gain medium (see detailed explanation below with reference to FIGS. 7a-7b). When the stress is removed, the Q returns to its normal high value and the cavity releases the energy in temporally overlapping laser pulses 56a and 56b. Alternately, the cavity could be configured so that the stress-induced state corresponds to a high Q factor. To maintain high contrast in the loss-modulation, the orientation of the stress was keyed at 45 degrees with respect to the slow/fast axes of the PM fiber 47a (47b).

As shown in FIG. 4, fiber chains 42a and 42b are mounted on structure 43 that prevents the fibers from moving either axially or radially. In this embodiment, the shared modulator 60 includes a PZT 62 that is held against the fiber chains by a pair of fine adjustment screws 64. The screws are threaded through a structure 66 that is held in a fixed relation from mounting structure 43 above PZT 62. The screws are adjusted to set an initial position of the PZT whereby the pulses overlap and are preferably almost perfectly aligned. The screws compensate for any misalignment of the PZT and for any differences in how the respective fiber chains respond to the application of stress. Application of voltage pulses 68 to PZT 62 causes it to expand and press down on both fiber chains simultaneously. Alternately, the PZT can be placed against the fiber with high stress and relaxed to pull up on the fiber. The PZT is a simple, low cost device that can be mounted on the fiber chain in a compact package. The PZT operates at less than 50V, which is very important for purposes of safety qualification, has a fast response time and is capable of fast repetitions.

As shown in FIGS. 5a-5b and 6a-6c, the use of a shared modulator to Q-switch the fiber lasers can produce very high performance. In one embodiment, a first chain was operated at a wavelength of 1550.50 nm and pulse width of 21.9 ns with an average and peak power of 13.6 mW and 7.74 W, respectively. The second chain was operated at a wavelength of 1538.63 nm and pulse width of 18.3 ns with an average and peak power of 10.1 mW and 6.90 W, respectively. The repetition rate of both fiber lasers is 80 KHz. Each fiber chain included a 2 cm length of gain fiber of phosphate glass doped with 2 wt. % of Er and 2 wt. % of Yb. The gratings were formed in passive silica fiber at the specified wavelengths. The narrowband and broadband gratings had a precision $\Delta\lambda$=0.05 nm and 0.3 nm, respectively. The fiber chain was pumped with a 390 mW single-mode pump.

Figure 6B:
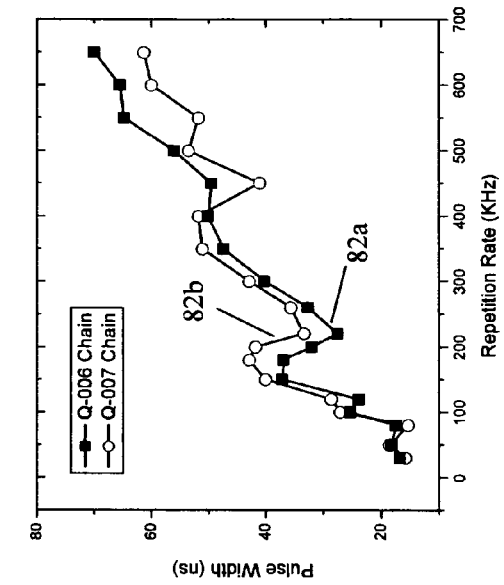
FIGS. 6a-6c are plots of the Q-switched lasers' average power, pulse width and peak power against repetition rate.
Figure 6C:
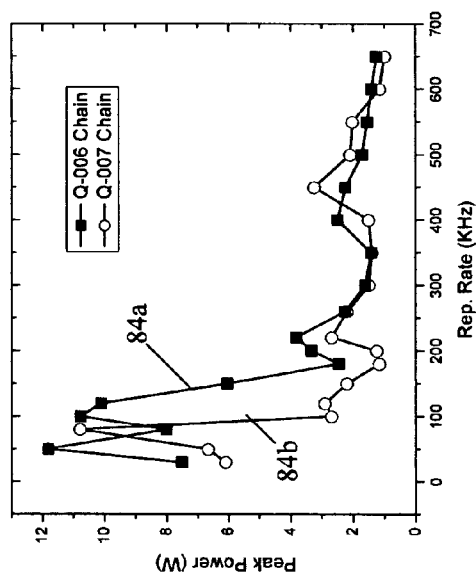
Figure 6A:
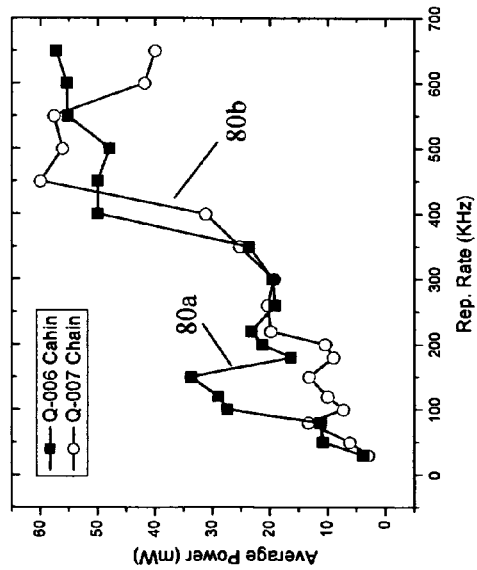

A temporal overlap of >50% is acceptable for certain applications, >80% is considered good, >90% is very good and of course 100% is ideal. As shown in FIGS. 5a-5b, the approximately 20 ns pulses 70 and 72 had a temporal overlap of better than 80%. FIGS. 6(a), (b), and (c) illustrate the relationship between fiber laser repetition rate and average output power 80a, 80b, pulse width 82a, 82b, and peak power 84a, 84b, respectively, for the first and second fiber chains. The performance of these two fiber lasers is very similar.

A full presentation of the Q-switched fiber laser is given in copending U.S. patent application Ser. No. 10/665,032 entitled "All-Fiber Q-switched Laser", filed on Sep. 16, 2003, which is hereby incorporated by reference. An overview of the interaction of the stress-induced birefringence with the polarization dependence of the resonant cavity that Q-switches the laser is illustrated in FIGS. 7a and 7b.

Figure 7A:
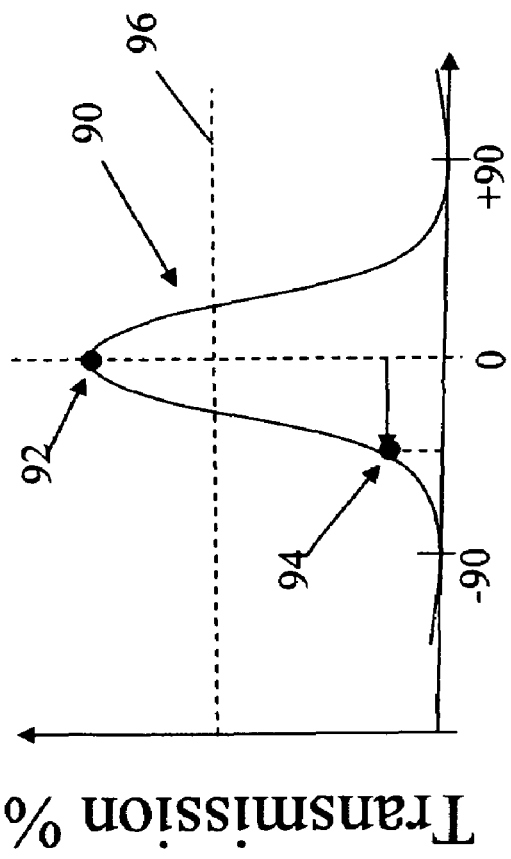
FIGS. 7a-7b are diagrams illustrating the interaction of polarization dependence of the laser cavity and stress-induced birefringence to Q-switch the fiber laser.

FIG. 7a is a plot 90 of the transmission (reflectance) versus polarization state of the light at the wavelength where the gratings are aligned to lase. For purposes of explanation only, we assume that the light in the cavity is ordinarily linearly polarized with a vertical or "V-polarization" and the cavity is configured to have a high transmission (reflectance) 92 for V-polarized light at the laser wavelength. In the ordinary unstressed state, the cavity losses are low and the cavity would sustain laser oscillation. When the retardance having the optical axis 45 deg. with respect to V/H, vertical or horizontal, of the stress induced birefringence is quarter-wave or $\pi/2$, the light is rotated to a horizontal or "H-polarization" at which the transmission (reflectance) 94 is below the threshold 96 needed to sustain laser oscillation. The birefringence need only be sufficient to shift the polarization to a point on the curve below the threshold. The combination of stress-induced birefringence with a polarization-dependent cavity provides an efficient Q-switched laser.

Figure 7B:
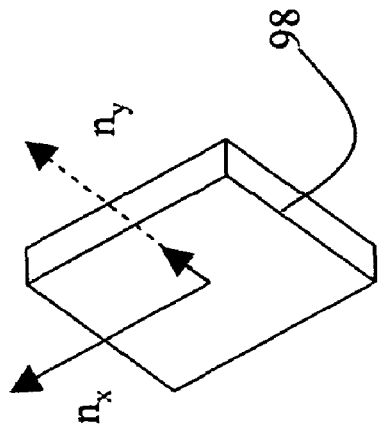

FIG. 7b illustrates the concept of stress-induced birefringence. A material that displays two difference indices of refraction $n_x$ and $n_y$ in a cross-section of the fiber is said to be birefringent. It is well known that the application of mechanical stress to an isotropic material (same refractive index in all directions) will change the refractive indices and induce birefringence. For example, an isotropic material 98 such as an optical fiber has indices of refraction $n_x$ and $n_y$ of equal value in a cross-section of the fiber. V-polarized light traveling through this isotropic material will be retarded by an equal amount in all directions and its polarization will be unaffected. However, the application of radial stress to the fiber, by pushing or pulling on the side of the fiber, will, for example, reduce refractive index $n_y$ and induce birefringence, when the direction of polarization is not the direction of one of the optical axis of birefringence. The same light propagating through the now birefringent material will be retarded by different amounts affecting the polarization. In the example given above, if the induced birefringence is quarter-wave a double-pass through the material will change V-polarized light to H-polarized light, if the axis of birefringence, which is a function of the orientation of the stress, is 45 deg. to the vertical/horizontal.

Simultaneously controlling the stress-induced birefringence of two or more all-fiber polarization-dependent resonant cavities through a shared modulator defines a new architecture for Q-switched lasers that ensures temporal overlap of their respective pulses. The all-fiber Q-switched laser can be configured with a variety of glasses, dopants, fibers and gratings to output laser pulses and sequences of pulses at different wavelengths, power levels, mode structures (single and multimode), pulse widths and repetition rates. In one embodiment gain fibers are formed of an oxide-based multi-component glass such as phosphate, germanate or tellurite and doped with one or more rare-earth elements (Er, Yb, Nd, Tm, Ho). Multi-component glasses support higher concentrations of rare-earth dopants, e.g. 0.5 to 30 wt. % without quenching or clustering, orders of magnitude higher than conventional silica glasses. These glasses support both higher output powers and shorter cavity lengths needed for single-frequency operation. Different glasses and dopants are used to achieve different wavelengths of operation e.g. 1 µm, 1.5 µm, 2 µm, 3 µm etc. However, current multi-component glasses are not very photosensitive and relatively fragile. Thus, the PM and non-PM fibers are suitably formed from passive silica glass and fusion spliced to the gain fiber. A suitable process for fusion splicing thermally dissimilar fiber is described in U.S. Pat. No. 6,866,429 entitled "Method of Angle Fusion Splicing Silica Fiber with Low-Temperature Non-Silica Fiber".

Figure 8:
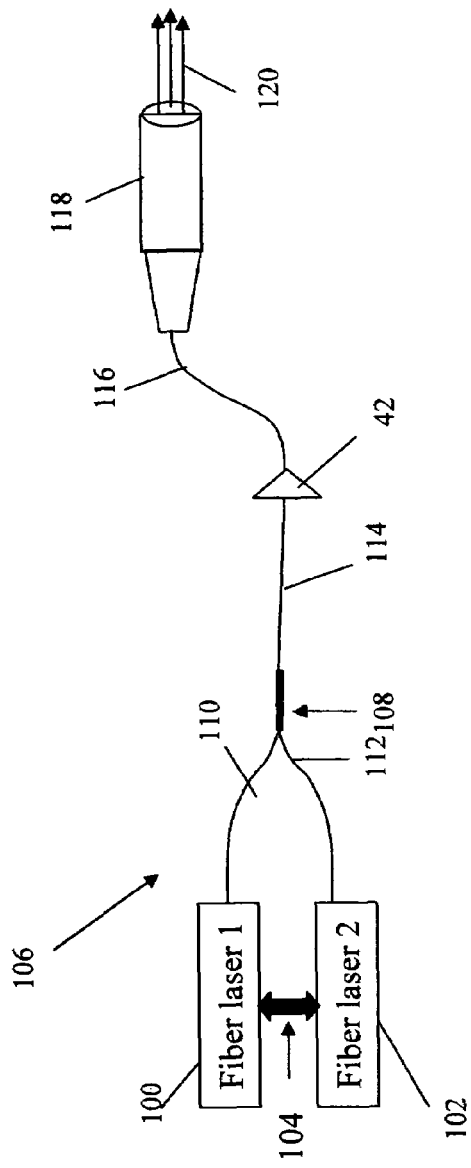
FIG. 8 is a block diagram of a light source using a pair of Q-switched fiber lasers through difference frequency generation (DFG) by nonlinear optical materials.
Figure 9:
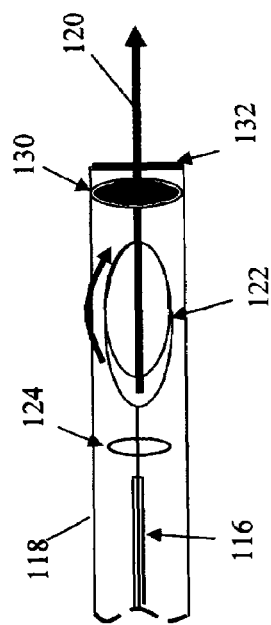
FIG. 9 is a diagram of a generator head.
Figure 10:
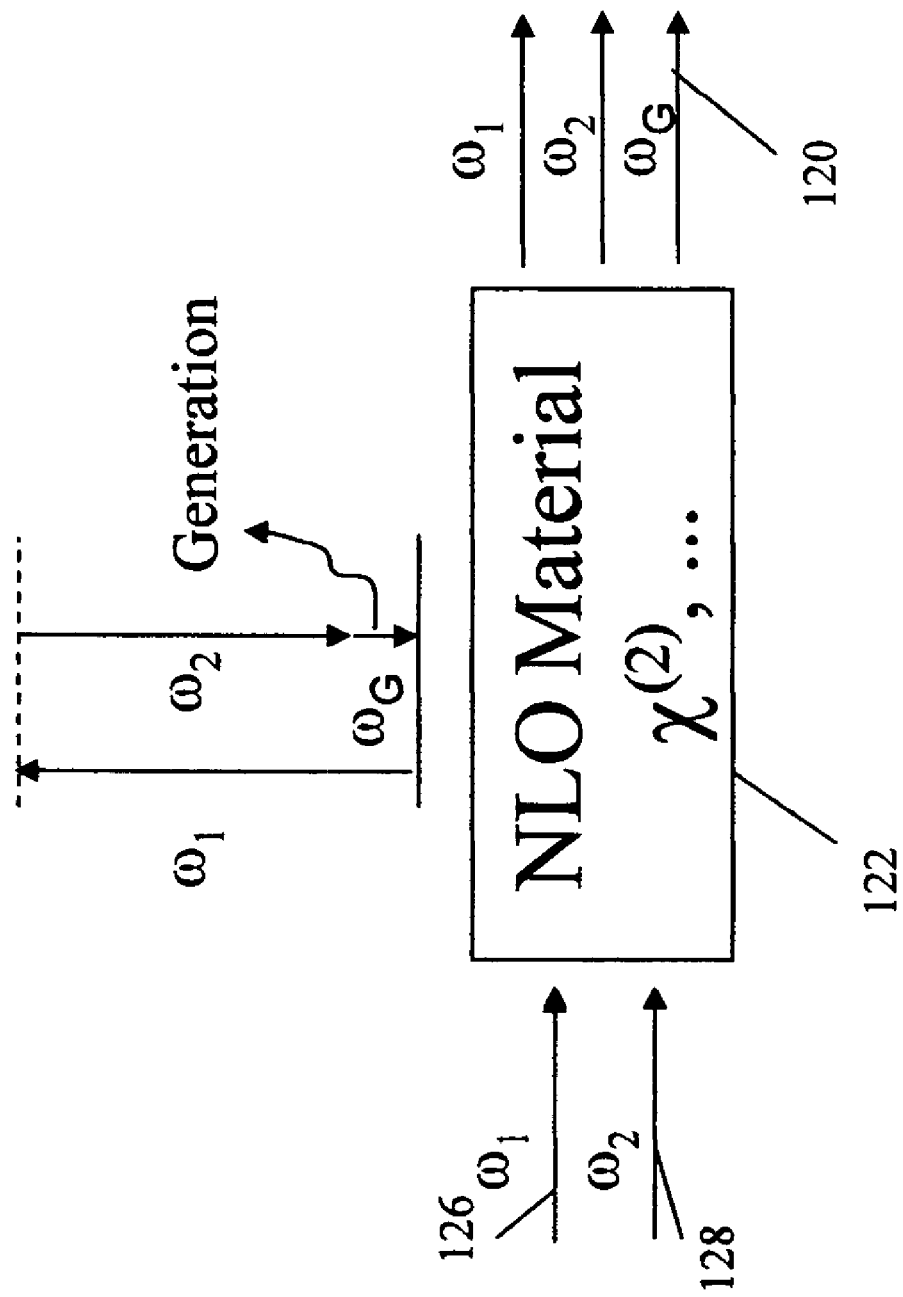
FIG. 10 is a diagram of difference-frequency generation (DFG) using a nonlinear optical (NLO) crystal.

As shown in FIGS. 8-10, a pair of simultaneously Q-switched lasers 100 and 102 controlled with a shared modulator 104 provide the front-end for a low frequency light source 106 implemented through difference frequency generation (DFG) by nonlinear optical (NLO) materials, e.g. crystals such as GaAs or GaSe or polymers such as DAST as shown in FIG. 8. Lasers 100 and 102 generate pulsed outputs at different frequencies $\omega 1$ and $\omega 2$. For a THz source (0.3 to 10 THz) the frequency difference is typically in the range of 0.3 to 10 THz. For a GHz source (30 to 300 GHz) the frequency difference is typically in the range of 30 to 300 GHz. The fiber lasers preferably generate single-frequency (single-transverse and single-longitudinal mode) outputs to ensure wavelength stability.

A fiber beam combiner 108 includes a pair of input fibers 110 and 112 that are spliced to the fiber lasers and an output fiber 114 that is spliced to a fiber pigtail 116 of a generator head 118. Alternately, a free-space beam combiner could be used. The fiber beam combiner combines the laser outputs and routes the combined output to the generator head 26 where a nonlinear interaction process in the NLO material generates low-frequency radiation 120 that is output from the head. This "all-fiber" solution from the pump lasers to the generator head produces a very compact, lightweight and cost effective low-frequency source. If needed, a fiber amplifier 122 can spliced between the beam combiner 108 and generator head 118 to amplify the combined signal. The insertion of a 1×N fiber splitter in the optical path after beam combiner 108 scales the source to N channels. Alternatively, optical amplifiers can be inserted before the beam combiner.

As shown in FIG. 9, inside the generator head 118, the combined laser output is coupled from fiber pigtail 116 to a nonlinear optical (NLO) material 122 through a fiber collimator 124. As illustrated in FIG. 10, the difference frequency generation is a second-order nonlinear process through second-order susceptibility of the NLO material 122. The two input beams 126 and 128 with frequencies $\omega 1$ and $\omega 2$ ($\omega > \omega 2$ with the difference within the desired frequency region) may have different polarization orientations relative to the optical axis of the NLO material so that they have same optical propagation indices to achieve phase matching. Quasi-phase matching can also be implemented by periodically-poled crystal such as PPLN. During the process, each $\omega 1$ being annihilated will be accompanied by one $\omega 2$ and one $\omega_G = \omega 1 - \omega 2$ being generated coherently. The radiation 120 at frequency $\omega_G$ is passed through another collimator 130 and an output window 132 to filter out residual $\omega 1$ and $\omega 2$.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A laser source, comprising:
   a first Q-switched fiber laser having a first polarization dependent active fiber chain configured to generate a first sequence of laser pulses at a frequency $\omega 1$;
   a second Q-switched fiber laser having a second polarization dependent active fiber chain configured to generate a second sequence of laser pulses at a frequency $\omega 2$, wherein the first and second fiber chains are fixed to a mounting structure; and
   a shared modulator comprising a piezoelectric transducer (PZT) that selectively applies radial stress to both said first and second polarization dependent active fiber chains simultaneously to induce birefringence and switch the cavity Q-factors to store energy in the active fiber chain and then release the energy in the first and second sequences of temporally overlapping laser pulses,
   said shared modulator further comprises a calibration mechanism that adjusts an initial position of the PZT so that said first and second laser pulses overlap temporally, said calibration mechanism comprises a structure above the PZT in a fixed space relation to the mounting structure and first and second adjust screws through the structure and contacting the PZT to adjust its initial position.

2. A laser source comprising:
   a first Q-switched fiber laser having a first polarization dependent active fiber chain including a polarization maintaining (PM) fiber and a non-PM fiber configured to generate a first sequence of laser pulses at a frequency $\omega 1$;
   a second Q-switched fiber laser having a second polarization dependent active fiber chain including a polarization maintaining (PM) fiber and a non-PM fiber configured to generate a second sequence of laser pulses at a frequency $\omega 2$; and
   a shared modulator that selectively applies radial stress to the non-PM fiber of both said first and second polarization dependent active fiber chains simultaneously to induce birefringence and switch the cavity Q-factors to store energy in the active fiber chain and then release the energy in the first and second sequences of temporally overlapping laser pulses,
   wherein said first and second polarization dependent active fiber chains each comprises a narrowband grating and a broadband grating formed on fibers on opposite sides of a gain fiber, at least one of said narrowband or broadband grating fibers being a non-PM fiber.

3. A laser source comprising:
   a first Q-switched fiber laser having a first polarization dependent active fiber chain including a polarization maintaining (PM) fiber and a non-PM fiber configured to generate a first sequence of laser pulses at a frequency $\omega 1$;
   a second Q-switched fiber laser having a second polarization dependent active fiber chain including a polarization maintaining (PM) fiber and a non-PM fiber configured to generate a second sequence of laser pulses at a frequency $\omega 2$; and
   a shared modulator that selectively applies radial stress to the non-PM fiber of both said first and second polarization dependent active fiber chains simultaneously to induce birefringence and switch the cavity Q-factors to store energy in the active fiber chain and then release the energy in the first and second sequences of temporally overlapping laser pulses wherein the temporal overlap of the first and second pulses is at least 80%.

4. A laser source comprising:
   a first Q-switched fiber laser having a first polarization dependent active fiber chain including a polarization maintaining (PM) fiber and a non-PM fiber configured to generate a first sequence of laser pulses at a frequency $\omega 1$ with a pulse-width less than 100 ns;
   a second Q-switched fiber laser having a second polarization dependent active fiber chain including a polarization maintaining (PM) fiber and a non-PM fiber configured to generate a second sequence of laser pulses at a frequency $\omega 2$ with a pulse-width less than 100 ns; and
   a shared modulator that selectively applies radial stress to the non-PM fiber of both said first and second polarization dependent active fiber chains simultaneously to induce birefringence and switch the cavity Q-factors to store energy in the active fiber chain and then release the energy in the first and second sequences of temporally overlapping laser pulses.

5. The laser source of claim 4, wherein the pulse-width of said first and second pulses is less than 30 ns.

6. A laser source comprising:
   a first Q-switched fiber laser having a first polarization dependent active fiber chain including a polarization maintaining (PM) fiber and a non-PM fiber configured to generate a first sequence of single-frequency laser pulses at a frequency $\omega 1$;
   a second Q-switched fiber laser having a second polarization dependent active fiber chain including a polarization maintaining (PM) fiber and a non-PM fiber configured to generate a second sequence of single-frequency laser pulses at a frequency $\omega 2$; and
   a shared modulator that selectively applies radial stress to the non-PM fiber of both said first and second polarization dependent active fiber chains simultaneously to induce birefringence and switch the cavity Q-factors to store energy in the active fiber chain and then release the energy in the first and second sequences of temporally overlapping laser pulses.

7. A laser source comprising:
   a first Q-switched fiber laser having a first polarization dependent active fiber chain including a polarization maintaining (PM) fiber and a non-PM fiber configured to generate a first sequence of laser pulses at a frequency $\omega 1$;
   a second Q-switched fiber laser having a second polarization dependent active fiber chain including a polarization maintaining (PM) fiber and a non-PM fiber configured to generate a second sequence of laser pulses at a different frequency $\omega 2$, wherein said Q-switched lasers are configured so that first and second pulses have approximately perpendicular polarizations;
   a shared modulator that selectively applies radial stress to the non-PM fiber of both said first and second polarization dependent active fiber chains simultaneously to induce birefringence and switch the cavity Q-factors to store energy in the active fiber chain and then release the energy in the first and second sequences of temporally overlapping laser pulses;
   a beam combiner configured to combine the temporally overlapping first and second laser pulses; and
   a generator head including a nonlinear optic (NLO) material where a nonlinear interaction process in the NLO material generates low-frequency radiation that is output from the head.

8. The laser source of claim 7, wherein the generator head outputs GHz or THz radiation.

9. A laser source, comprising:

a first Q-switched fiber laser having a first polarization dependent active fiber chain including a grating on a polarization-maintaining (PM) fiber a non-PM fiber segment, said laser configured to generate a first sequence of single-frequency laser pulses at a frequency $\omega 1$ having a pulse-width less than 30 ns;

a second Q-switched fiber laser having a second polarization dependent active fiber chain including a grating on a polarization-maintaining (PM) fiber a non-PM fiber segment, said laser configured to generate a second sequence of single-frequency laser pulses at a different frequency $\omega 2$ having a pulse-width less than 30 ns; and a shared piezoelectric transducer (PZT) that selectively applies radial stress to the non-PM fiber segments in both said first and second polarization dependent active fiber chains simultaneously to induce birefringence and switch the cavity Q-factors to store energy in the active fiber chain and then release the energy in the first and second sequences of temporally overlapping laser pulses with a temporal overlap of at least 80%.

10. A laser source comprising:

a generator head including a nonlinear optic (NLO) material;

a first Q-switched fiber laser having a first polarization dependent active fiber chain configured to generate a first sequence of laser pulses at a frequency $\omega 1$;

a second Q-switched fiber laser having a second polarization dependent active fiber chain configured to generate a second sequence of laser pulses at a different frequency $\omega 2$;

a shared modulator that selectively applies radial stress to both said first and second polarization dependent fiber chains simultaneously to induce birefringence and switch the cavity Q-factors to store energy in the active fiber chains and then release the energy in the first and second sequences of temporally overlapping laser pulses; and a beam combiner configured to combine the temporally overlapping first and second laser pulses and route the combined output to the generator head where a nonlinear interaction process in the NLO material generates low-frequency 0.3 to 10 THz radiation that is output from the generator head.

11. A laser source comprising:

a generator head including a nonlinear optic (NLO) material;

a first Q-switched fiber laser having a first polarization dependent active fiber chain configured to generate a first sequence of laser pulses at a frequency $\omega 1$;

a second Q-switched fiber laser having a second polarization dependent active fiber chain configured to generate a second sequence of laser pulses at a different frequency $\omega 2$;

a shared modulator that selectively applies radial stress to both said first and second polarization dependent fiber chains simultaneously to induce birefringence and switch the cavity Q-factors to store energy in the active fiber chains and then release the energy in the first and second sequences of temporally overlapping laser pulses; and a beam combiner configured to combine the temporally overlapping first and second laser pulses and route the combined output to the generator head where a nonlinear interaction process in the NLO material generates low-frequency 30 to 300 GHz radiation that is output from the generator head.

12. A laser source comprising:

a generator head including a nonlinear optic (NLO) material;

a first Q-switched fiber laser having a first polarization dependent active fiber chain that includes a polarization maintaining (PM) fiber and a non-PM fiber configured to generate a first sequence of laser pulses at a frequency $\omega 1$;

a second Q-switched fiber laser having a second polarization dependent active fiber chain that includes a polarization maintaining (PM) fiber and a non-PM fiber configured to generate a second sequence of laser pulses at a different frequency $\omega 2$;

a shared modulator that selectively applies radial stress to the non-PM fiber of both said first and second polarization dependent fiber chains simultaneously to induce birefringence and switch the cavity Q-factors to store energy in the active fiber chains and then release the energy in the first and second sequences of temporally overlapping laser pulses; and a beam combiner configured to combine the temporally overlapping first and second laser pulses and route the combined output to the generator head where a nonlinear interaction process in the NLO material generates low-frequency that is output from the generator head.

13. The laser source of claim 12, wherein said Q-switched lasers are configured so that first and second pulses have approximately perpendicular polarizations.

14. A laser source comprising:

a generator head including a nonlinear optic (NLO) material;

a first Q-switched fiber laser having a first polarization dependent active fiber chain configured to generate a first sequence of single-frequency laser pulses at a frequency $\omega 1$;

a second Q-switched fiber laser having a second polarization dependent active fiber chain configured to generate a second sequence of single-frequency laser pulses at a different frequency $\omega 2$;

a shared modulator that selectively applies radial stress to both said first and second polarization dependent fiber chains simultaneously to induce birefringence and switch the cavity Q-factors to store energy in the active fiber chains and then release the energy in the first and second sequences of temporally overlapping laser pulses; and a beam combiner configured to combine the temporally overlapping first and second laser pulses and route the combined output to the generator head where a nonlinear interaction process in the NLO material generates low-frequency that is output from the generator head.

* * * * *